No. 706,631. Patented Aug. 12, 1902.
E. L. ANDERSON.
CHEMICAL GENERATOR OF ELECTRICITY.
(Application filed Sept. 30, 1901.)
(No Model.)
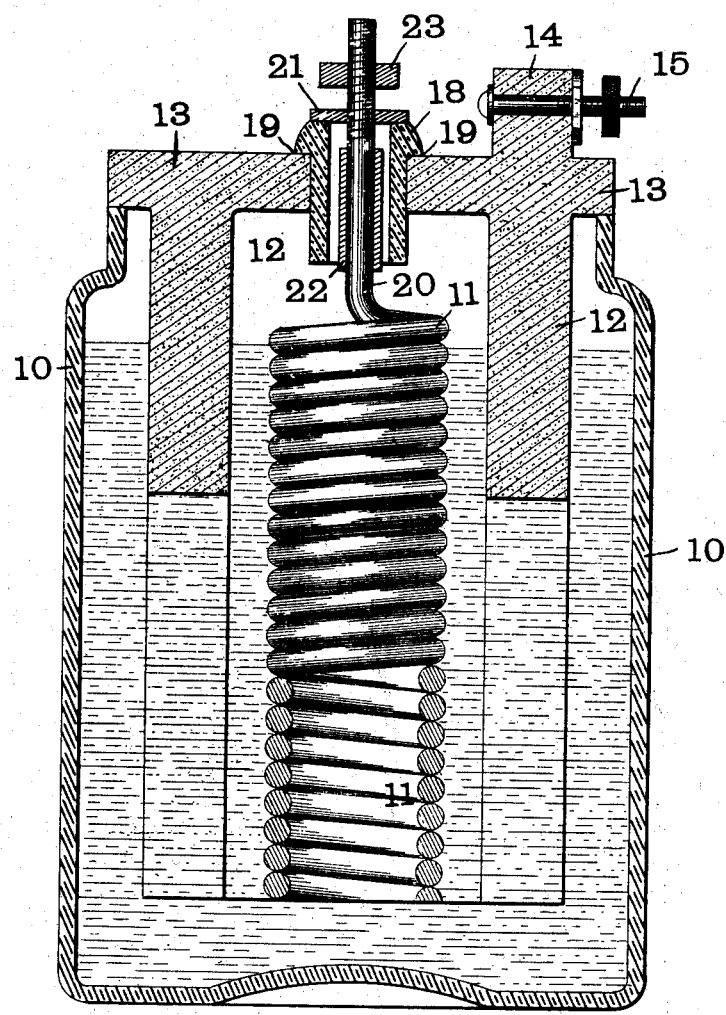
Witnesses
W. A. Alexander
J. R. Watkins
Inventor
E. L. Anderson
By Attorneys
Fowler & Bryan

UNITED STATES PATENT OFFICE.

EDWARD LACEY ANDERSON, OF ST. LOUIS, MISSOURI, ASSIGNOR TO JOHN A. GILLIAM, TRUSTEE, OF ST. LOUIS, MISSOURI.

CHEMICAL GENERATOR OF ELECTRICITY.

SPECIFICATION forming part of Letters Patent No. 706,631, dated August 12, 1902.

Application filed September 30, 1901. Serial No. 77,010. (No model.)

*To all whom it may concern:*

Be it known that I, EDWARD LACEY ANDERSON, a citizen of the United States, residing at the city of St. Louis, in the State of Missouri, have invented a certain new and useful Chemical Generator of Electricity, of which the following is such a full, clear, and exact description as will enable any one skilled in the art to which it appertains to make and use the same, reference being had to the accompanying drawing, forming part of this specification.

My invention relates more particularly to what are commonly known as "primary" batteries, and has for its object to provide a cell for such a battery which will be so simple and inexpensive as to be capable of ordinary commercial application and which will also generate a large quantity of electric current and have a comparatively light weight.

To this end my invention consists of a cell in which are a pair of electrodes, one of which is aluminium, and an electrolyte composed of a suitable halogen salt or salts—*i. e.*, a fluorid or a chlorid, or both—an acid, and preferably in practice a depolarizing agent.

Referring now to the drawing herewith, which illustrates a cell embodying my invention, 10 represents a glass jar of suitable shape, 11 the aluminium electrode, and 12 the carbon electrode. The carbon electrode 12 is preferably cylindrical in form, inclosing the aluminium electrode 11, and has openings or slits extending upward from its bottom and is closed at its upper end by the integral top 13, which forms the lid of the jar 10 and, as will be described below, also serves to support the aluminium electrode 11. Upon one side of the lid 13 is the carbon projection 14, which has secured to it a suitable binding-screw 15, which may be of any ordinary form. Through a perforation in the center of the top 13 extends the porcelain bushing 18, which rests upon said top 13 by means of a shoulder 19. The above is of the usual construction and arrangement. The stem 20 of the aluminium electrode, which I prefer to make of an aluminium wire coiled into a helix, as shown, extends upward through the opening in the bushing 18 and is screw-threaded at its upper end. Upon this screw-threaded portion is carried the nut 21, which rests upon the top of the bushing 18 and supports the aluminium electrode 11 in the jar. Below this nut 21 the stem 20 carries a piece of rubber tubing 22 for insulating purposes, and above the nut 21 is a milled binding-screw 23.

The electrolyte I prefer to use in this cell is made as follows: Water, three pounds, and nitric acid, (thirty-eight per cent.,) two pounds, and bichromate of potash, two pounds, are well mixed and allowed to cool. About six ounces of calcium fluorid (fluor-spar) is then added, and the solution is allowed to stand about six or eight hours to allow the calcium fluorid to dissolve. The elements are then placed in the jar and the battery is ready for use.

I do not wish to hazard any theories as to the chemical action of this cell; but apparently the calcium fluorid is dissolved but not decomposed by the solution and seems to form a coating over the aluminium electrode which protects it to a great degree from the action of the solution. When a battery is desired for producing very strong currents for closed-circuit work, it is desirable to add about four ounces of zinc chlorid or other soluble chlorid to the solution above described as constituting the electrolyte of my cell.

A considerable number of changes may be made in the composition of the electrolyte of my cell. For instance, any soluble fluorid or chlorid may be used that is not decomposed by the acid employed or any suitable depolarizer can be substituted for bichromate of potash.

When the elements of the cell above described are connected by a wire in the usual manner, it will be found that a difference of potential of about one and one-half volts is created and that a current will flow in the external circuit.

Having fully described my invention, what I claim as new, and desire to secure by Letters Patent of the United States, is—

1. In a single fluid-cell, an aluminium electrode, a negative electrode, and an electrolyte in contact with both of said electrodes containing a suitable halogen salt and nitric acid.

2. In a chemical generator of electricity, an aluminium electrode, a negative electrode, and an electrolyte containing a fluorid and nitric acid.

3. In a chemical generator of electricity, an aluminium electrode, a negative electrode, and an electrolyte containing calcium fluorid and nitric acid.

4. In a chemical generator of electricity, an aluminium electrode, a negative electrode, and an electrolyte containing a fluorid, a chlorid, and nitric acid.

5. In a chemical generator of electricity, an aluminium electrode, a negative electrode, and an electrolyte containing calcium fluorid, zinc chlorid, and nitric acid.

6. In a chemical generator of electricity, an aluminium electrode, a negative electrode, and an electrolyte containing a suitable halogen salt, nitric acid, and a depolarizing agent.

7. In a chemical generator of electricity, an aluminium electrode, a negative electrode, and an electrolyte containing a fluorid, an acid, and a depolarizing agent.

In testimony whereof I have hereunto set my hand and affixed my seal in the presence of the two subscribing witnesses.

EDWARD LACEY ANDERSON. [L. S.]

Witnesses:
  JAMES H. BRYSON,
  J. R. WATKINS.